United States Patent
Lee et al.

(10) Patent No.: US 10,865,268 B1
(45) Date of Patent: Dec. 15, 2020

(54) METHOD FOR PREPARING WEAR-RESISTANT-HYBRID

(71) Applicant: National Chung-Shan Institute of Science and Technology, Taoyuan (TW)

(72) Inventors: Chang-Lun Lee, Taichung (TW); Bei-Huw Shen, Taichung (TW); Chih-Chia Chen, Taichung (TW); Wen-Yen Hsieh, Miaoli County (TW); Chin-Lung Chiang, Changhua County (TW)

(73) Assignee: National Chung-Shan Institute of Science and Technology, Taoyuan (TW)

( * ) Notice: Subject to any disclaimer, the term of this patent is extended or adjusted under 35 U.S.C. 154(b) by 0 days.

(21) Appl. No.: 16/600,573

(22) Filed: Oct. 14, 2019

(30) Foreign Application Priority Data

May 28, 2019 (TW) .............................. 108118656 A

(51) Int. Cl.
*C08G 18/10* (2006.01)
*C08G 18/38* (2006.01)
*C08G 18/75* (2006.01)

(52) U.S. Cl.
CPC ......... *C08G 18/3893* (2013.01); *C08G 18/10* (2013.01); *C08G 18/755* (2013.01)

(58) Field of Classification Search
None
See application file for complete search history.

(56) References Cited

U.S. PATENT DOCUMENTS

| 2006/0159923 A1* | 7/2006 | Becker-Willinger ........................ C04B 35/632 428/403 |
| 2008/0226901 A1* | 9/2008 | Stanjek ..................... C09D 7/62 428/334 |
| 2019/0062622 A1* | 2/2019 | Harasin .............. C08G 18/7671 |

OTHER PUBLICATIONS

Jeon et al. (Synthesis and characterizations of waterborne polyurethane-silica hybrids using sol-gel process) Colloids and Surfaces A: Physicochemical and Engineering Aspects 302, No. 1-3 (2007): 559-567. (Year: 2007).*

(Continued)

*Primary Examiner* — Robert S Loewe
(74) *Attorney, Agent, or Firm* — Winston Hsu

(57) ABSTRACT

A method for preparing a wear-resistant hybrid, includes (A) providing nano-silica with hydroxyl groups on its surface to react with an isocyanate-based silane to form silica with silyl groups; (B) subjecting the silica with silyl groups to a hydrolytic condensation reaction by using a sol-gel technology to form highly bifurcated Si-HB nanoparticles with hydroxyl groups; (C) providing a diisocyanate to react with a polyol to form a urethane pre-polymer; and (D) subjecting the Si-HB nanoparticles with hydroxyl groups to an addition reaction with the urethane pre-polymer and with a chain-extending reagent to form a hybrid of Si-polyurethane (PU/Si-HB), whereby a wear-resistant hybrid of Si-polyurethane is prepared.

10 Claims, 7 Drawing Sheets

(56) References Cited

OTHER PUBLICATIONS

Petrović, et al. (Structure and properties of polyurethane-silica nanocomposites) Journal of applied polymer science 76, No. 2 (2000): 133-151. (Year: 2000).*

Lee et al. (Synthesis of polyether-based polyurethane-silica nanocomposites with high elongation property) Polymers for advanced technologies 16, No. 4 (2005): 328-331. (Year: 2005).*

Sadeghi et al. (Gas separation properties of polyether-based polyurethane-silica nanocomposite membranes) Journal of Membrane Science 376, No. 1-2 (2011): 188-195. (Year: 2011).*

* cited by examiner

METHOD FOR PREPARING WEAR-RESISTANT-HYBRID

BACKGROUND OF THE INVENTION

1. Field of the Invention

The present invention generally relates to a method for preparing a polyurethane hybrid, and more particularly the present invention is directed to a method for preparing a wear-resistant polyurethane hybrid.

2. Description of the Prior Art

Polyurethane polymeric materials have been widely used in various daily needs products and industrial products, including runways, flooring, shoe materials, artificial leather, furniture seats, rollers, etc., which play a very important role in our daily life. A polyurethane polymer with good physical properties can be made from the addition polymerization reaction of a polyol with a diisocyanate. The soft polyhydric segments and the rigid isocyanate and the chain-extending reagent segments are alternately arranged. With different ratios of the monomers, a variable combination may be formed, to be two types: polyether type and polyester type. They have good physical and mechanical properties and are widely used in daily needs products and industrial products, such as elastomer sole materials, foam materials, paints, adhesives, sealants, synthetic leather, films, runway pavement, . . . etc. However, due to the limitation of the nature of the polymer materials, wear resistance and tear resistance properties are insufficient. Wear appears after long-term use and it is getting worse and worse after even longer time of use to cause further deterioration of the physical properties, for example material wear and material collapse, etc., to make its application lifetime extremely reduced so it is in urgent need of improvement.

Nano-Silica is a non-toxic, non-polluting inorganic non-metallic material with high activity, which has a good reinforcing effect on reinforcing and wear-resistant properties. It may serve as a filler to improve the overall material properties. When a small amount of nano-particles embedded in the friction groove of the contact surface, it helps forma transfer film on the contact surface, to greatly reduce the wear damage.

Conventionally, metal oxide powders including alumina particles, powders such as silicon carbide and silica of different sizes are mechanically dispersed in and added into polyurethane to increase the wear resistance and mechanical properties of the material by physical mixing. However, owing to the lack of chemical bonding between the two and to weak compatibility, the addition causes the increase of viscosity of the material, the difficulty of processing, reduced mechanical properties, and insufficient of the wear resistance to meet the demands.

Therefore, there is a great need in the industry to develop a polyurethane hybrid and a preparation method thereof, by chemically bonding the silica particles and the chemical bond formed by the reaction with the urethane pre-polymer. It enhances the interfacial force and thus exhibits excellent mechanical stability and wear resistance to meet the demanding requirements of the industrial applications.

SUMMARY OF THE INVENTION

In view of the above disadvantages of prior art, one main objective of the present invention is to provide a method for preparing a wear-resistant polyurethane hybrid, to modify the surface of silica particles to have functional groups, and to react the modified silica nanoparticles with a urethane pre-polymer to be solidified. Because the functionalized silica particles are capable of being chemically bonded to the urethane pre-polymer so as to enhance the interfacial force to result in excellent mechanical stability and wear resistance property.

Since the interaction between the polymer substrate and the filler has a great influence on the properties of the hybrid, the enhancement of the bonding between the substrate and the filler is the key to improve the characteristics of the composite hybrid. The silica particles have characteristics such as high strength, high hardness, and high heat resistance, and the modified rigid particles are capable of forming chemical bonding force with the polymer substrate, so it is able to suppress the progressive development of the internal and external cracking when the substrate is subjected to an external force, so as to further improve the wear resistance, the heat resistance, the strength and the durability of the polymer substrate.

In order to achieve the above objectives, according to one aspect of the present invention, a method for preparing a wear-resistant-hybrid is provided. The method includes at least the following steps: (A) providing nano-silicon dioxide (nano-silica) with hydroxyl groups on its surface to react with an isocyanate-based silane to form silicon dioxide (silica) with silyl groups; (B) subjecting the silicon dioxide with silyl groups to a hydrolytic condensation reaction by using sol-gel technology to form highly bifurcated Si-HB nanoparticles with hydroxyl groups; (C) providing a urethane pre-polymer which is obtained from the reaction of a diisocyanate with a polyol; and (D) subjecting the Si-HB nanoparticles with hydroxyl groups to an addition reaction with the urethane pre-polymer and with a chain-extending reagent to form a hybrid of Si-polyurethane (PU/Si-HB).

The isocyanate-based silane in the step (A) may be 3-isocyanatopropyltriethoxysilane (IPTS).

The silicon dioxide with silyl groups in the step (A) or in the step (B) may be triethoxysilylated silicon dioxide.

The diisocyanate in the step (C) is selected from a group consisting of aliphatic isocyanates and aromatic isocyanates. The diisocyanate may be isophoronediisocyanate (IPDI). The polyol in the step (C) is selected from a group consisting of polyether polyols and polyester polyols. A molar equivalent ratio for the reaction of the diisocyanate to the polyol may be 2:1. A reaction temperature of the step (C) may be between 70° C. and 90° C., and the reaction time may be between 10 hours and 20 hours.

The chain-extending reagent in the step (D) may be 1,4-butanediol. The weight of the Si-HB nanoparticles may be 1% to 3% of a total weight of the hybrid of the Si-polyurethane (PU/Si-HB). A reaction temperature of the step (D) may be between 70° C. and 90° C., and the reaction time may be between 1 hour and 5 hours.

The present invention proposes that the nano-silica with hydroxyl groups reacts with an isocyanate-containing silane, then it is subjected to a hydrolytic condensation reaction by using sol-gel technology to form a functionalized Si-HB which is further subjected to an addition reaction with the introduction of a urethane pre-polymer to prepare an organic-inorganic material of an excellent wear resistance property, namely a polyurethane/Si hybrid (PU/Si-HB hybrid).

The present invention proposes a method for preparing a wear-resistant-hybrid. In the method, the nano-silica particles are subjected to a grafting reaction to render the silica particles reactive functional groups to further undergo an addition reaction with an organic pre-polymer so as to effectively enhance the compatibility between organic materials and inorganic materials and to improve the wear resistance property of the polyurethane material. The present invention combines the rigid and wear-resistant properties of the nano-silica with the elastomeric property of the urethane to result in the advantages of wear resistance and low pollution and to show a great potential for the market.

These and other objectives of the present invention will no doubt become obvious to those of ordinary skill in the art after reading the following detailed description of the preferred embodiment that is illustrated in the various figures and drawings.

DETAILED DESCRIPTION

The embodiments of the present invention are described below by some specific examples, and those skilled in the art can readily appreciate the advantages and functions of the present invention from the disclosure of the specification.

Figure 1:
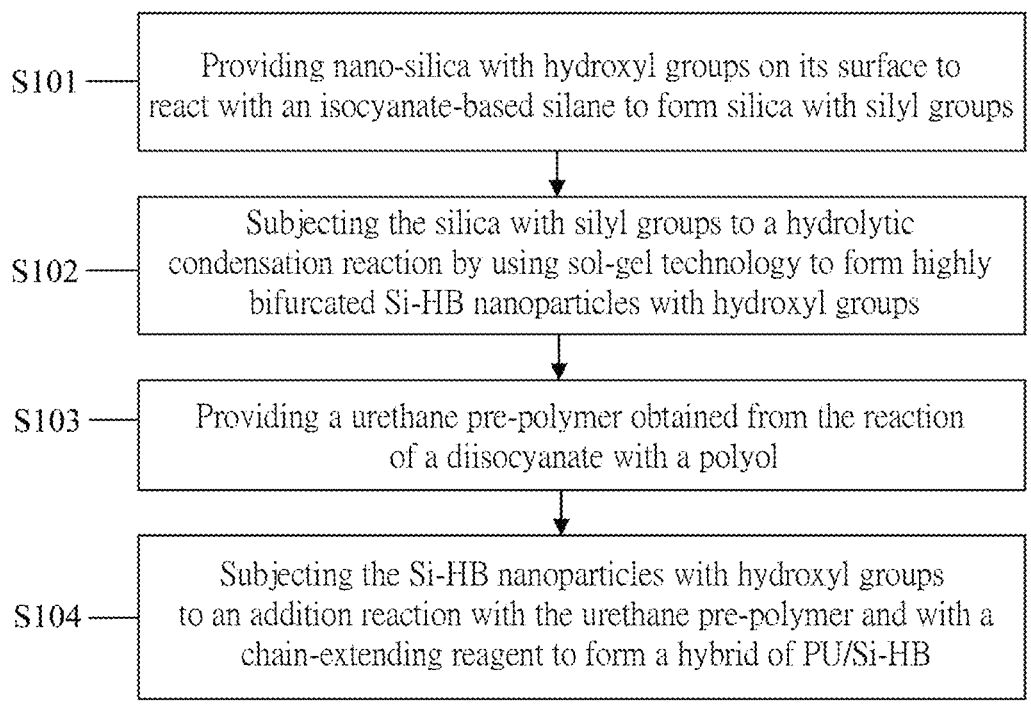
FIG. 1 illustrates a flow chart of a method for preparing a wear-resistant hybrid of the present invention.

Please refer to FIG. 1, which is a flow chart of a method for preparing a wear-resistant hybrid of the present invention. As shown in the figure, the present invention provides a method for preparing a wear-resistant-hybrid. The method includes at least the following steps: (A) providing nano-silica with hydroxyl groups on its surface to react with an isocyanate-based silane to form silica (silicon dioxide) with silyl groups (S101); (B) subjecting the silica with silyl groups to a hydrolytic condensation reaction by using sol-gel technology to form highly bifurcated Si-HB nanoparticles with hydroxyl groups (S102); (C) providing a urethane pre-polymer which is obtained from the reaction of a diisocyanate with a polyol (S103); and (D) subjecting the Si-HB nanoparticles with hydroxyl groups to an addition reaction with the urethane pre-polymer and with a chain-extending reagent to form a hybrid of the Si-polyurethane (PU/Si-HB) (S104).

In one embodiment of the present invention, the isocyanate-functional-group-containing 3-isocyanatopropyltriethoxysilane (IPTS) is subjected to an addition reaction with the nano-silica which has hydroxyl groups. Then, the sol-gel technology is used to carry out a hydrolytic condensation reaction to form highly bifurcated Si-HB nanoparticles with hydroxyl groups. Next, by means of another addition reaction, the highly bifurcated Si-HB nanoparticles with hydroxyl groups react with the urethane pre-polymer to form a hybrid of Si-polyurethane (PU/Si-HB) with excellent wear characteristics.

EXAMPLE

Example 1

Figure 2:
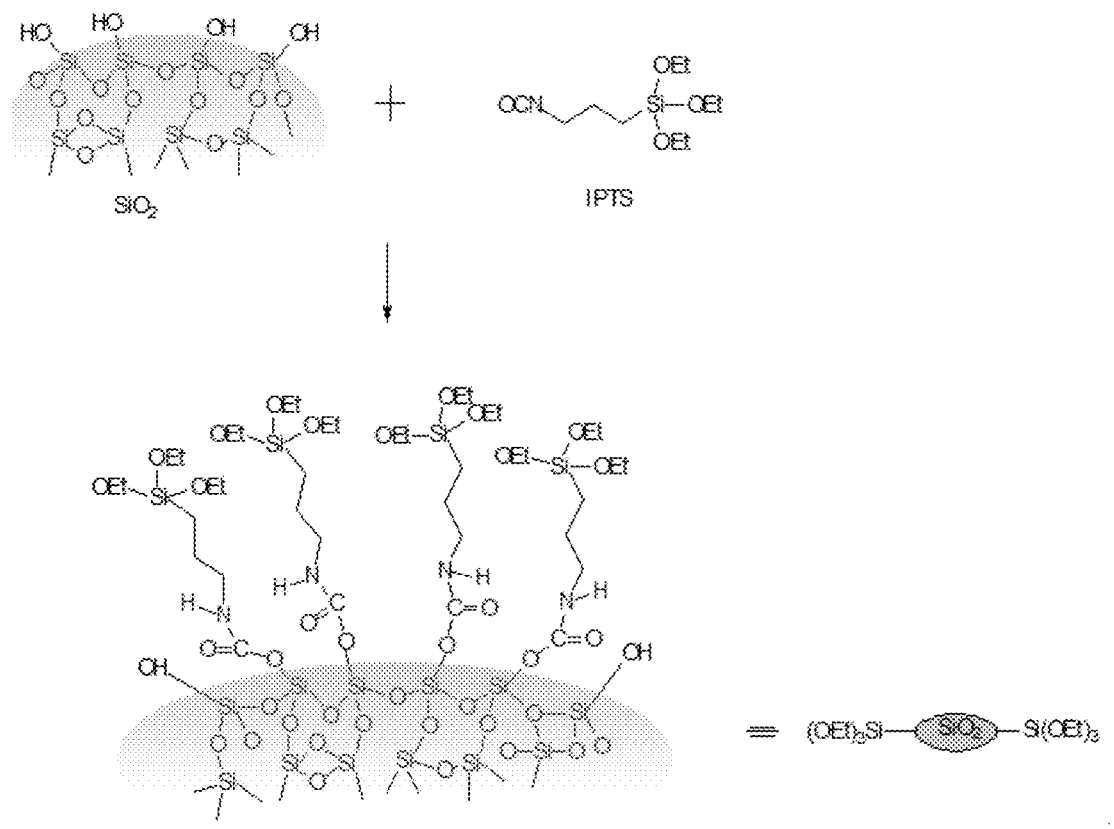
FIG. 2 illustrates a schematic diagram of the reaction mechanism of the surface modification of the silicon dioxide according to the example of the present invention.

In this example, nano-silica $SiO_2$ with hydroxyl groups on its surface (1.12 g) is first dissolved in tetrahydrofuran (THF) in a bottle, then 3-isocyanatopropyltriethoxysilane (IPTS) (2.23 g) is introduced into the bottle, and the two are uniformly mixed with a magnet at a temperature of 80° C. for a reaction time 1.5 hour to form a solution of the silica with silyl groups. It is called solution A, and the reaction mechanism is shown in FIG. 2.

Example 2

Figure 3:
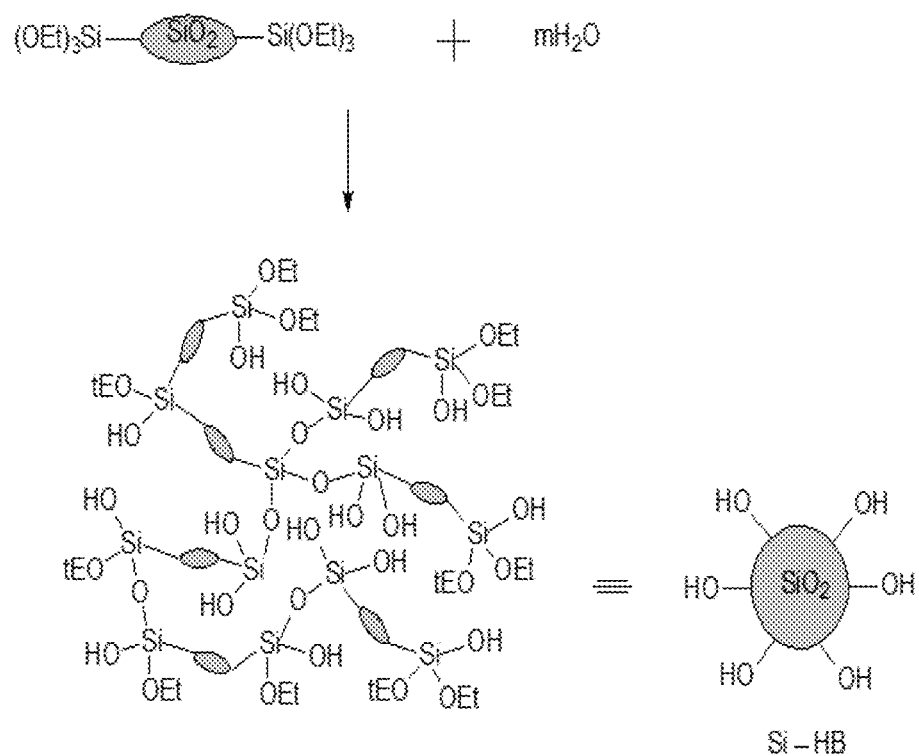
FIG. 3 illustrates a diagram of the reaction mechanism for preparing Si-HB nano-particles according to the example of the present invention.

In this example, a fixed amount of deionized water (DI water) is added to tetrahydrofuran (THF) and hydrochloric acid (HCl) is further added to adjust the pH value to 4 to be solution B. Solution B is slowly added dropwisely into solution A at a temperature of 50° C. to carry out the hydrolytic condensation reaction, and stirred for 4 hours to obtain the Si-HB nanoparticles. The reaction mechanism is shown in FIG. 3.

Example 3

Figure 4:
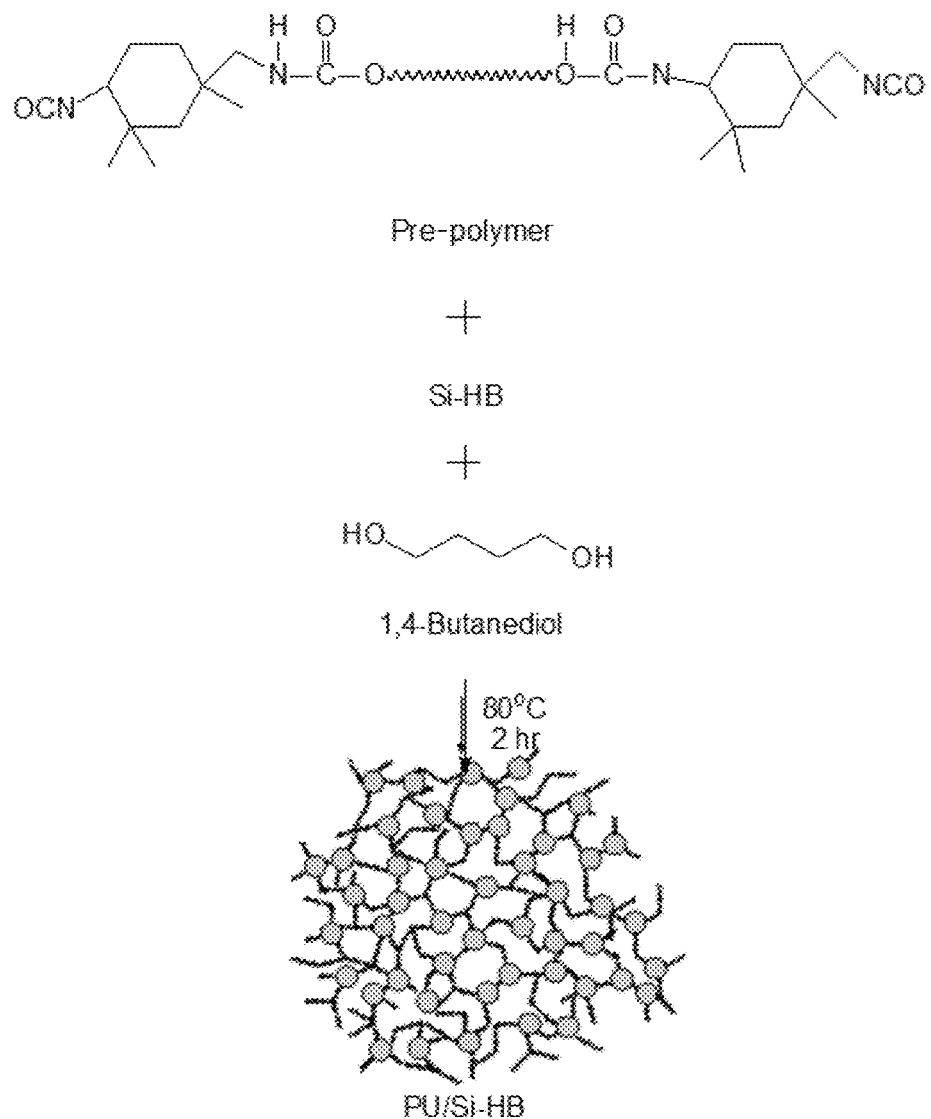
FIG. 4 illustrates a diagram of the reaction mechanism for preparing a PU/Si-HB hybrid according to the example of the present invention.

In this example, isophoronediisocyanate (IPDI) (9.66 g) and a polyol (Arcol polyol 1007) (20 g) are placed in a four-neck cylindrical reaction flask, filled with nitrogen, heated at 80° C. and mechanically stirred for 12 hours to prepare a urethane pre-polymer. A molar equivalent ratio of the diisocyanate to the polyol (NCO:OH) is 2:1. Gradually the Si-HB nanoparticles solution is added according to the total weight ratio of the product of 1%, 2%, 3%. Stirring the reaction continues for 4 hours, and finally the chain-extending reagent 1,4-butanediol (1,4BD) (0.5 g) is gradually added dropwisely to continue the reaction for 2 hours. Then, the synthesized PU/Si-HB product is applied onto a plate by a blade or by dip, and then it is dried in a vacuum oven for 12 hours at a temperature of 70° C. After 12 hours, the finished product is taken out and allowed to stand cool at room temperature, to complete the preparation of the hybrid of the Si-polyurethane (PU/Si-HB). The reaction mechanism is shown in FIG. 4.

Figure 5:
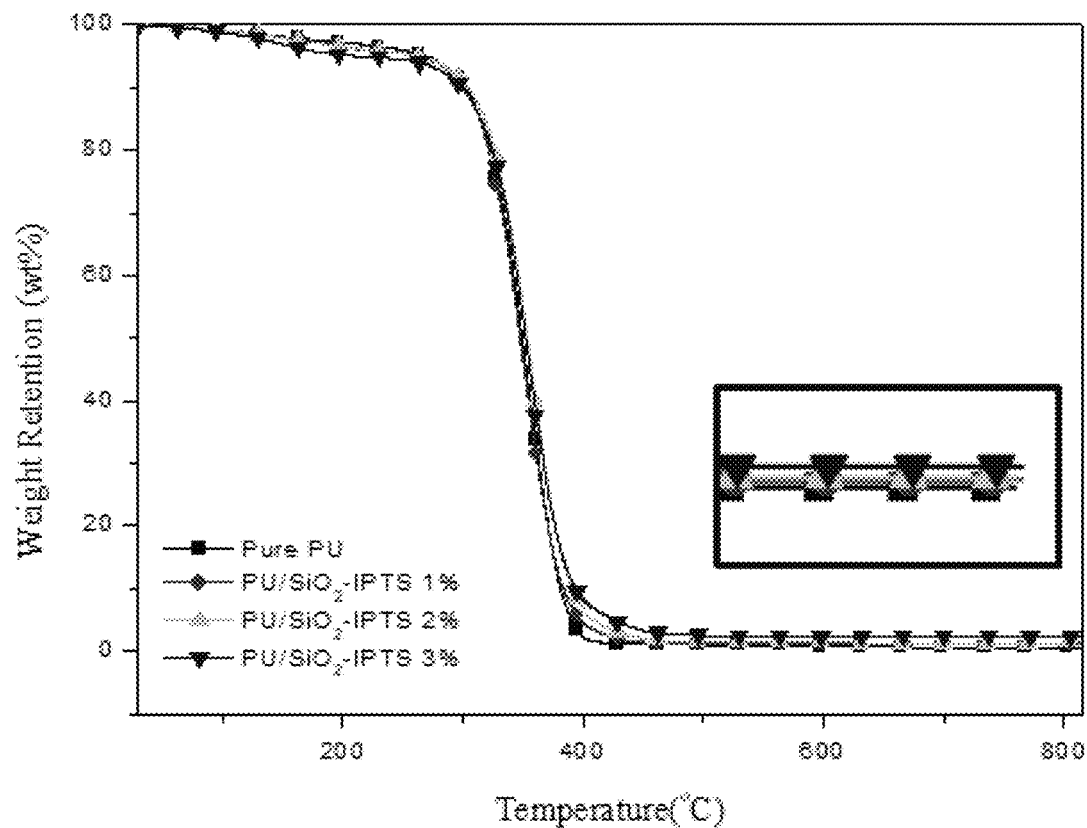
FIG. 5 illustrates a diagram of the thermogravimetric analysis (TGA) of the PU/Si-HB hybrid according to the example of the present invention.
Figure 6:
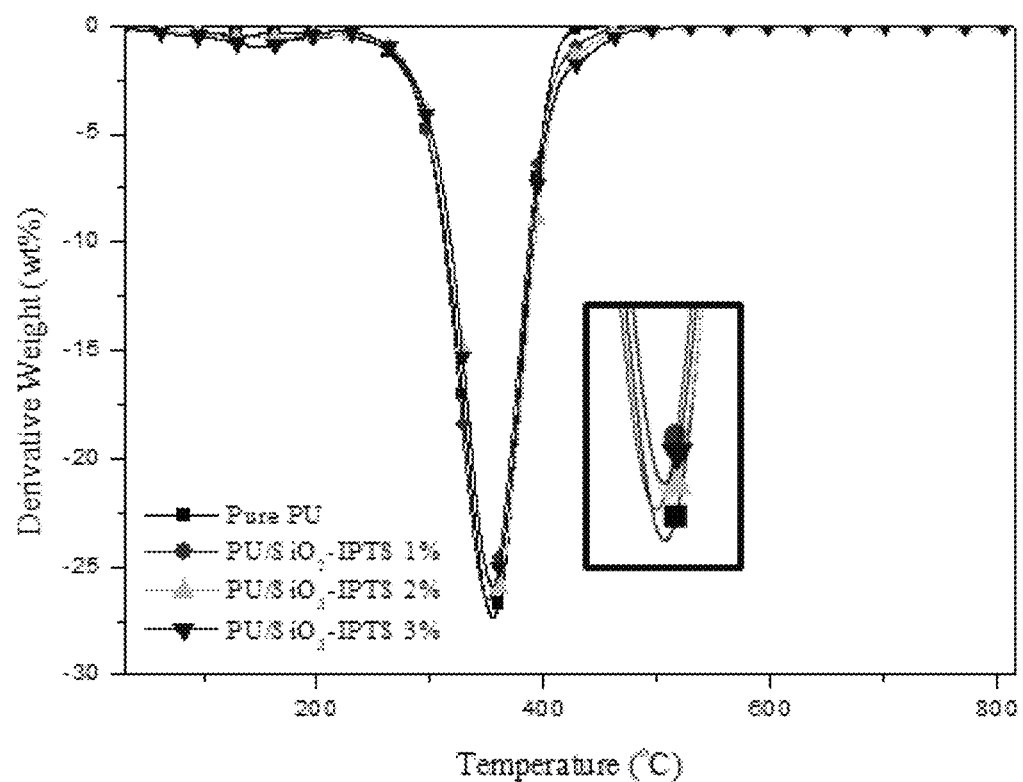
FIG. 6 illustrates a diagram of the differential thermogravimetric (DTG) analysis of the PU/Si-HB hybrid according to the example of the present invention.

Please refer to FIG. 5 and FIG. 6. They show the thermogravimetric analysis (TGA) diagram and the differential thermogravimetric (DTG) analysis diagram of the hybrid of Si-polyurethane (PU/Si-HB) according to the examples of the present invention. The $SiO_2$-IPTS (Si-HB) nanoparticles react with the urethane pre-polymer substrate at a concentration ratio of 1%, 2%, and 3%, and it is subjected to a thermogravimetric analysis at a temperature change rate of 20° C./min under a nitrogen atmosphere. The thermal properties of the hybrid of Si-polyurethane (PU/Si-HB) are analyzed by TGA to investigate the properties which are exhibited by different concentrations of silica. The results in Table 1 show that with the increase of Si-HB content, the maximum decomposition rate ($R_{max}$) is about −27.3 wt %/min when the maximum PU decomposition temperature ($T_{max}$) is 354.1° C., and the ($T_{max}$) of PU/Si-HB is 355.5° C. and its $R_{max}$ slows down to −25.8 wt %/min. The char residual increases from 0.598 wt % of pure PU polyurethane to 2.295 wt %, which indicates that the hybrid of Si-polyurethane (PU/Si-HB) does have better thermal stability.

TABLE 1

| Sample no. | $T_{max}$ (° C.) | $R_{max}$ (wt %/min) | char (wt %) |
| --- | --- | --- | --- |
| Pure PU | 354.1 | −27.3 | 0.598 |
| 1% | 351.0 | −26.5 | 1.21 |
| 2% | 354.2 | −26.2 | 1.406 |
| 3% | 355.5 | −25.8 | 2.295 |

$T_{max}$: maximum decomposition temperature;
$R_{max}$: maximum decomposition rate;
Char: charcoal residual.

Figure 7:
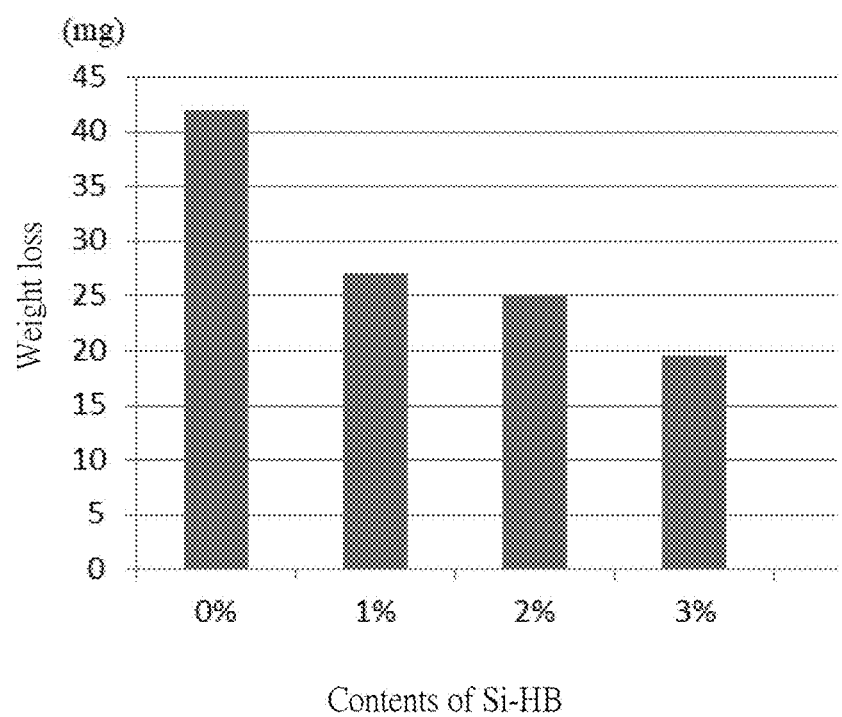
FIG. 7 illustrates a diagram of the Taber wear test analysis of the PU/Si-HB hybrid according to the example of the present invention.

Please refer to FIG. 7. It shows the diagram of a wear test analysis of the hybrid of Si-polyurethane (PU/Si-HB) according to the examples of the present invention. Wear is the phenomenon that the contact surfaces of two solids rub against each other to cause the material to fall off from the surfaces. According to ASTM D4060 Taber test standard, pure polyurethane (PU) and a PU hybrid are tested under the condition of 500 g load, 60 rpm and 1000 turns of four concentrations of Si-HB nanoparticles from 0% to 3%. As shown in the figure, with the increase of the contents of Si-HB, it is observed that the amount of wear of the material decreases, from 42 mg of the pure polyurethane down to 19.6 mg of 3% of Si-HB nanoparticles. The friction force between the two objects is partially transferred and distributed to the harder nano-silica so as to reduce the material wear, because the Si-HB nanoparticles which are produced from the surface modification of IPTS and the hydrolytic condensation reaction of nano-silica are uniformly dispersed in the substrate polyurethane.

The present invention discloses a method for preparing a wear-resistant hybrid by using a highly active and non-toxic nano-silica to reinforce a polymeric substrate, to assist the formation of a transfer film on the contact surfaces to improve the wear resistance of the polyurethane elastomer material. And the compatibility between the inorganic silica particles and the organic polymeric substrate is enhanced by the grafting reaction. Further, the hydrolytic condensation reaction is carried out by the sol-gel technology to form highly bifurcated Si-HB nanoparticles with active hydroxyl groups to have reactive bonding with organic polymeric elastomer substrate to improve the overall performance of the material. Through the addition reaction, the hydroxyl highly bifurcated nanoparticles (Si-HB) may react with the urethane pre-polymer to form a Si-polyurethane organic-inorganic hybrid to improve the wear resistance and the mechanical properties of the material, and to make it have wider applications in the future.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for preparing a wear-resistant hybrid, comprising:
   (A) providing nano-silica with hydroxyl groups on its surface to react with an isocyanate-based silane to form silica with silyl groups;
   (B) subjecting the silica with silyl groups to a hydrolytic condensation reaction by using sol-gel technology to form highly bifurcated Si-HB nanoparticles with hydroxyl groups;
   (C) providing a diisocyanate to react with a polyol to form a urethane pre-polymer;
   (D) subjecting the Si-HB nanoparticles with hydroxyl groups to an addition reaction with the urethane pre-polymer and with a chain-extending reagent to form a hybrid of Si-polyurethane (PU/Si-HB).

2. The method for preparing a wear-resistant hybrid according to claim 1, wherein the isocyanate-based silane in the step (A) is 3-isocyanatopropyltriethoxysilane (IPTS).

3. The method for preparing a wear-resistant hybrid according to claim 1, wherein the silica with silyl groups in the step (A) or in the step (B) is triethoxysilylated silica.

4. The method for preparing a wear-resistant hybrid according to claim 1, wherein the diisocyanate in the step (C) is selected from a group consisting of aliphatic isocyanates and aromatic isocyanates.

5. The method for preparing a wear-resistant hybrid according to claim 1, wherein the diisocyanate in the step (C) is isophoronediisocyanate (IPDI).

6. The method for preparing a wear-resistant hybrid according to claim 1, wherein the polyol in the step (C) is selected from a group consisting of polyether polyols and polyester polyols.

7. The method for preparing a wear-resistant hybrid according to claim 1, wherein a molar equivalent ratio of the diisocyanate to the polyol in the step (C) is 2:1.

8. The method for preparing a wear-resistant hybrid according to claim 1, wherein the chain-extending reagent in the step (D) is 1,4-butanediol.

9. The method for preparing a wear-resistant hybrid according to claim 1, wherein a weight of the Si-HB nanoparticles in the step (D) is 1% to 3% of a total weight of the hybrid of Si-polyurethane (PU/Si-HB).

10. The method for preparing a wear-resistant hybrid according to claim 1, wherein a reaction temperature of the step (C) or of the step (D) is between 70° C. and 90° C.

\* \* \* \* \*